United States Patent
Kwon et al.

(10) Patent No.: US 10,846,836 B2
(45) Date of Patent: Nov. 24, 2020

(54) VIEW SYNTHESIS USING DEEP CONVOLUTIONAL NEURAL NETWORKS

(71) Applicants: Junghyun Kwon, San Jose, CA (US); Dinghuang Ji, Chapel Hill, NC (US); Max McFarland, Cupertino, CA (US); Silvio Savarese, Stanford, CA (US)

(72) Inventors: Junghyun Kwon, San Jose, CA (US); Dinghuang Ji, Chapel Hill, NC (US); Max McFarland, Cupertino, CA (US); Silvio Savarese, Stanford, CA (US)

(73) Assignee: RICOH COMPANY, LTD., Tokyo (JP)

( * ) Notice: Subject to any disclaimer, the term of this patent is extended or adjusted under 35 U.S.C. 154(b) by 519 days.

(21) Appl. No.: 15/351,340

(22) Filed: Nov. 14, 2016

(65) Prior Publication Data

US 2018/0137611 A1    May 17, 2018

(51) Int. Cl.
*G06T 5/50* (2006.01)
*G06T 3/00* (2006.01)
(Continued)

(52) U.S. Cl.
CPC .......... *G06T 5/50* (2013.01); *G06N 3/04* (2013.01); *G06N 3/08* (2013.01); *G06T 3/0093* (2013.01);
(Continued)

(58) Field of Classification Search
CPC ........... G06T 5/50; G06T 7/97; G06T 3/0093; G06T 2207/20228; G06T 2207/20084;
(Continued)

(56) References Cited

U.S. PATENT DOCUMENTS

| | | | |
|---|---|---|---|
| 5,745,668 A | 4/1998 | Poggio et al. | |
| 6,724,417 B1 * | 4/2004 | Hillis | H04N 7/144 348/14.08 |

(Continued)

FOREIGN PATENT DOCUMENTS

| | | | | |
|---|---|---|---|---|
| EP | 2389006 | 11/2011 | | |
| EP | 3086279 A1 * | 10/2016 | | G06T 3/4038 |

OTHER PUBLICATIONS

Flynn et al., "Deep Stereo: Learning to Predict New Views from the World's Imagery," 2016 IEEE Conference on Computer Vision and Pattern Recognition, IEEE, Jun. 27, 2016, pp. 5515-5524.
(Continued)

*Primary Examiner* — John W Lee
(74) *Attorney, Agent, or Firm* — Patent Law Works LLP (57) ABSTRACT

Disclosed is a system and method for generating intermediate views between two received images. To generate the intermediate views, a rectification network rectifies the two images and an encoder network encodes the two rectified images to generate convolutional neural network features. The convolutional neural network features are fed to a decoder network that decodes the features to generate a correspondence between the two rectified images and blending masks to predict the visibility of pixels of the rectified images in the intermediate view images. Using the correspondence between the two rectified images and blending masks, a view morphing network synthesizes intermediate view images depicting an object in the two images in a view between the two images.

17 Claims, 9 Drawing Sheets

(51) Int. Cl.
*G06T 7/00* (2017.01)
*G06N 3/04* (2006.01)
*G06N 3/08* (2006.01)

(52) U.S. Cl.
CPC ...... *G06T 7/97* (2017.01); *G06T 2207/10004* (2013.01); *G06T 2207/20084* (2013.01); *G06T 2207/20212* (2013.01); *G06T 2207/20228* (2013.01)

(58) Field of Classification Search
CPC ........... G06T 2207/20212; G06T 2207/10004; G06N 3/04; G06N 3/08
See application file for complete search history.

(56) References Cited

U.S. PATENT DOCUMENTS

| | | | | |
|---|---|---|---|---|
| 7,937,346 | B2* | 5/2011 | Kato | G06N 3/08 706/27 |
| 10,157,452 | B1* | 12/2018 | Tighe | G06K 9/00771 |
| 2014/0079297 | A1 | 3/2014 | Tadayon et al. | |
| 2014/0085501 | A1 | 3/2014 | Tran | |
| 2015/0213607 | A1* | 7/2015 | Jeong | G06T 7/97 345/427 |
| 2017/0161607 | A1* | 6/2017 | English | G06F 3/012 |

OTHER PUBLICATIONS

Zhou et al., "View Synthesis by Appearance Flow," ECCV 2016 Conference, Sep. 17, 2016, pp. 286-301.
Extended European Search for EP Patent Application 17200806.2 dated Apr. 9, 2018, 9 pages.
Dosovitskiy et al. "Learning to Generate Chairs with Convolutional Neural Networks" dated 2015, 9 pages.
Flynn et al. "DeepStereo: Learning to Predict New Views from the World's Imagery" dated Jun. 22, 2015, 9 pages.
Zhou et al. "View Synthesis by Appearance Flow" dated May 11, 2016, 15 pages.
Tatarchenko et al. "Multi-view 3D Models from Single Images with a Convolutional Network" dated Aug. 2, 2016, 20 pages.
Indian First Examination Report for IN Patent Application No. 201714039701 dated Mar. 19, 2020, 5 pgs.

* cited by examiner

VIEW SYNTHESIS USING DEEP CONVOLUTIONAL NEURAL NETWORKS

BACKGROUND

1. Field of the Invention

The present specification generally relates to the field of view synthesis and more particularly to novel view synthesis using deep convolutional neural networks.

2. Description of the Background Art

Novel view synthesis has practical applications, mostly in computer vision and virtual reality. For example, using computer vision to recognize an object in an image, it may be helpful to obtain images of the object in all possible different views. With limited images of the object in different views, view synthesis methods can generate images that depict the object in views not in the original images. Additionally, view synthesis may be used to create full virtual reality environments based on limited images or video footage. Recently, learning-based techniques utilizing deep convolutional neural networks have been successfully applied to the view synthesis problems. However, such techniques usually suffer from lack of texture details, geometric shape distortions, or excessive computational complexity.

SUMMARY

The techniques introduced herein overcome the deficiencies and limitations of the prior art, at least in part, with a system and method for generating novel views of an image using deep convolutional neural networks. To generate the middle view, a rectification network rectifies the two images and an encoder network encodes the two rectified images to generate convolutional neural network features. The convolutional neural network features are fed to a decoder network that decodes the features to generate dense point correspondences between the two rectified images and blending masks. Using the correspondence between the two rectified images and blending masks, a view morphing network morphs the two images to generate an intermediate view image depicting an object in the two images in a view between the two images.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

The systems and methods according to the techniques of this disclosure provide techniques for generating novel views of an image using deep convolutional neural networks.

Currently, novel view synthesis is approached in two broad categories: geometry-based approaches and learning-based approaches. Geometric approaches first try to estimate the approximate underlying 3D structure of the object and then apply some transformation to the pixels in the input image to produce the output image. Besides the requirement of somehow estimating the 3D structure, the other major downside of geometric approaches is that they produce holes in places where the source image does not have sufficient visual content (e.g. the back side of an object). In such cases, various types of texture hole-filling may be used but the hole-filling techniques are not always effective.

Learning-based approaches, on the other hand, use more information from input images to generate a novel view. For example, given a side view of a car, there is no way to guess what the front of the car looks like, unless the system has observed other fronts of cars to make an educated guess. Learning based approaches typically use training images to build a parametric model of the object class and then use the parametric model, together with the input image, to generate a novel view. However, results from parametric image generation are often too blurry.

View morphing can generate shape-preserving view synthesis results. View morphing can be thought of as three steps: (i) rectification, (ii) view synthesis by interpolation, and (iii) post-warping. Two input images, $I_1$ and $I_2$, are rectified by applying homographies $H_1$ and $H_2$ to $I_1$ and $I_2$, respectively, to align corresponding points of the two images on the same row. Such homographies can be computed from the fundamental matrix obtained from seven or more point correspondences between the images. The rectified image pair $R_1$ and $R_2$ can be viewed as captured from two parallel view cameras and linear interpolation of parallel views yields shape-preserving view synthesis results. Novel view images can be synthesized by linearly interpolating position and colors of corresponding points of $R_1$ and $R_2$. As the image pair is already rectified, such synthesis can be done on a row by row basis. Let $P_1 = \{p_1^1, \ldots, p_1^N\}$ and $P_2=\{p_2^1, \ldots, p_2^N\}$ denote the point correspondence sets between $R_1$ and $R_2$ where $p_1^i \in \mathfrak{R}^2$ and $p_2^j \in \mathfrak{R}^2$ are corresponding points only when i=j. With a between 0 and 1, a novel view $R_\alpha$ can be synthesized as:

$$R_\alpha((1-\alpha)p_1^i+\alpha p_2^i)=(1-\alpha)R_1(p_1^i)+\alpha R_2(p_2^i),$$

where i=1, N. Note that α=0 corresponds to $R_1$ and α=1 corresponds to $R_2$. As point correspondences found by feature matching are usually sparse, more correspondences may be determined by interpolating the existing correspondences. Post-warping with homographies can be optionally applied to $R_\alpha$ to obtain desired views. Such homographies can be determined by user-specified control points.

The techniques introduced herein generate a novel view by explicitly modeling geometric constraints between image pairs. The techniques include generating rectified representations of two input images within a view synthesis problem and producing dense point correspondences between the rectified representations of the two input images. Since the input images are rectified, the correspondence searching is simplified to a one-dimensional estimation problem. This makes the correspondence estimation problem significantly easier and less computationally intensive than existing methods. The techniques introduced herein use the one-dimensional dense point correspondences to generate an output image together with blending masks to explicitly model visibility of pixels in the output image. The techniques introduced herein produce results with less geometric shape distortion and clearer texture details while being less computationally extensive than existing methods.

For the purposes of this disclosure, reference numbers may be used to refer to components found in any of the figures, regardless of whether those reference numbers are shown in the figure being described. Further, where a reference number includes a letter referring to one of multiple similar components (e.g., component 000a, 000b, and 000n), the reference number may be used without the letter to refer to one or all of the similar components.

Figure 1A:
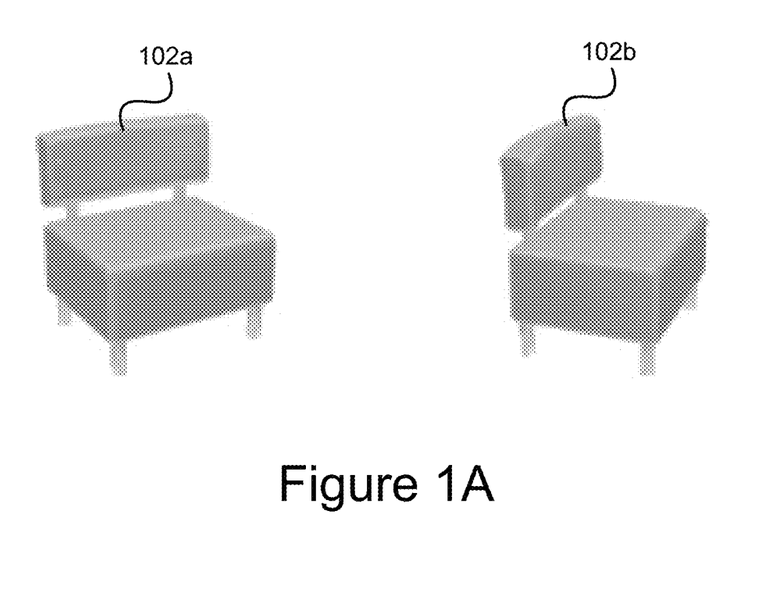
FIG. 1A is an example depicting two images from which a novel view is generated.
Figure 1B:
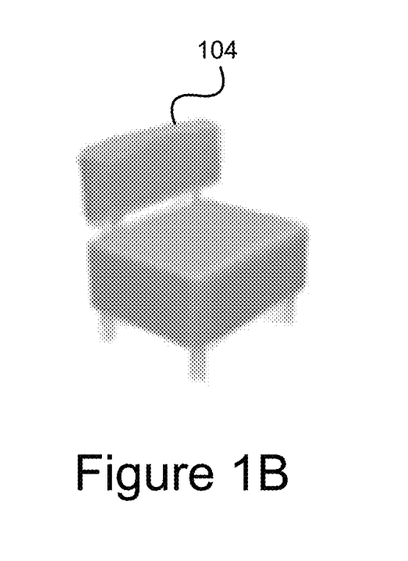
FIG. 1B is an example depicting a novel view generated from the example images of FIG. 1A.

FIG. 1A is an example depicting two images from which a novel view is generated. In the example of FIG. 1A, an image 102a of a chair is depicted from a left view and an image 102b of the chair is depicted from a right view. As described above, the techniques introduced herein provide for generating a novel view of an image given two views such as those depicted in FIG. 1A. FIG. 1B is an example depicting a novel view 104 generated from the example chair images of FIG. 1A using the techniques introduced herein.

Figure 2:
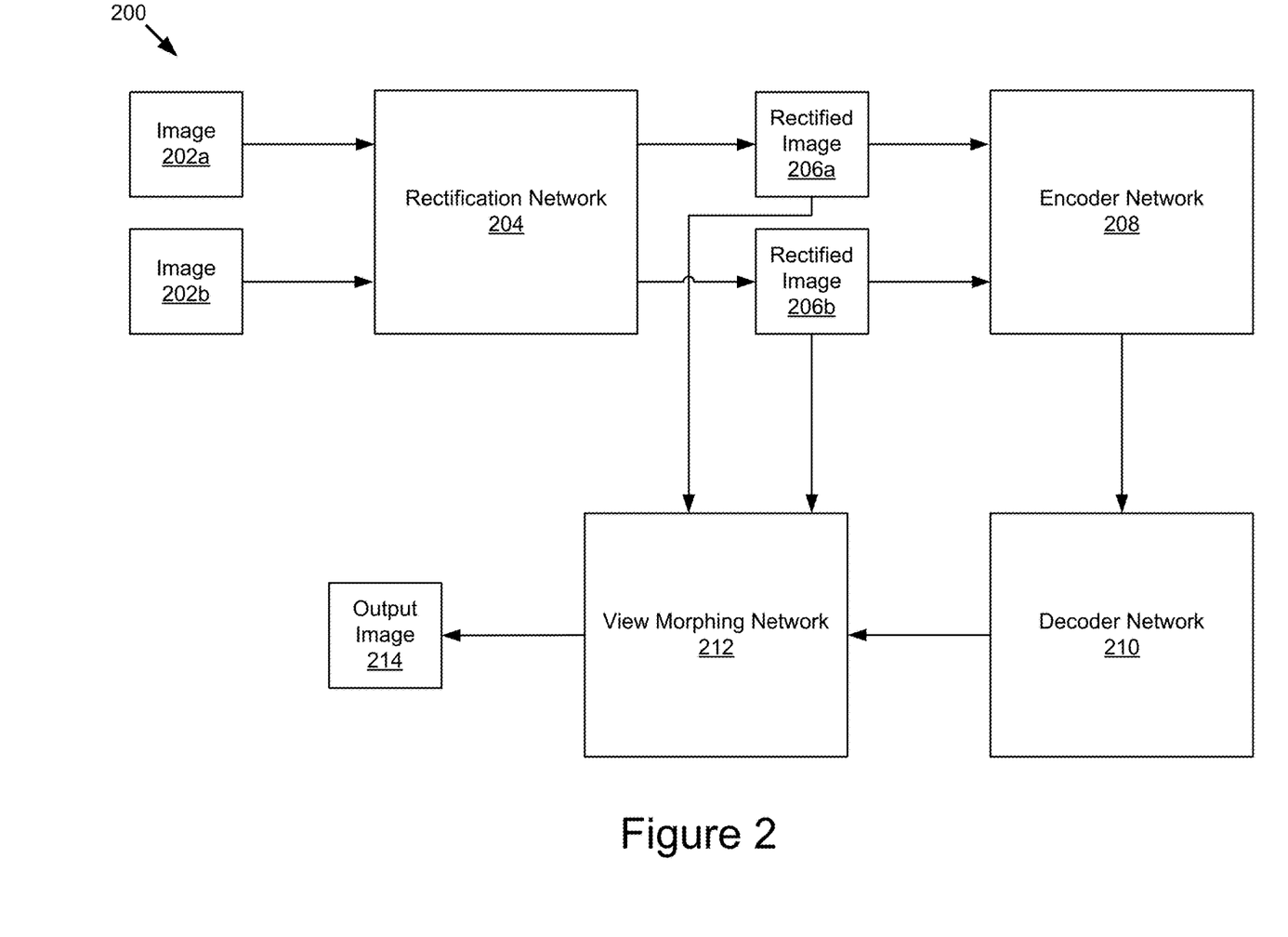
FIG. 2 is a block diagram depicting an example network for generating novel views according to the techniques disclosed herein.

FIG. 2 is a block diagram depicting an example network 200 for generating novel views according to the techniques disclosed herein. One existing view synthesis method utilizing deep convolutional neural networks estimates an appearance flow (e.g., dense point correspondences) between each of two input images and the target view as a two-dimensional flow field that can be adopted to reconstruct the target view. The main problem of that method is the geometric shape consistency is not considered in the process of generating the appearance flows. In contrast, the network 200 models the dense point correspondences between the two rectified representations of two input images. As a result of the rectification, the network 200 only has to estimate one-dimensional dense point correspondences instead of two-dimensional correspondences, which makes the correspondence estimation problem easier and thus makes the network 200 estimate the dense point correspondences more accurately. The network 200 thus includes an architecture which can automatically learn the rectified views of image pairs and the one-dimensional dense point correspondences within them.

As described in more detail with reference to the remaining figures, the network 200 takes image 202a and 202b as inputs to a rectification network 204 and generates rectified images 206a and 206b which are used as inputs to the encoder network 208. The encoder network 208 encodes the rectified images 206 using convolutional layers to generate a set of image features. The image features are used by the decoder network 210 to generate one-dimensional dense point correspondences and blending masks. The view morphing network 212 uses the one-dimensional dense point correspondences, the blending masks, and the rectified images 206 to generate the output image 214.

It should be noted that the network 200 network does not have viewpoint transformation information as an input as current view synthesis methods do. Instead, the techniques introduced herein allow the network 200 to learn homography transformations used to rectify two input images without viewpoint transformation information within the network 200. Test results have shown that the network 200 without viewpoint transformation information performs better than the prior method with viewpoint transformation information.

Some benefits of the unique architecture of network 200 include the following: 1) the unique one-dimensional dense point correspondences synthesize higher-quality images than typical two-dimensional dense point correspondences, which suffer from geometric shape distortions. This improvement is due to the geometric constraint that is imposed by the automatic rectification of the two input images by the network 200 that limits the correspondence search between the rectified image pairs to a one-dimensional search; 2) the network 200 does not require viewpoint transformation information as an input; 3) the network 200 can synthesize infinite image views between the two input images based on the estimated dense point correspondences and blending masks.

As depicted in the network 200 in the example of FIG. 2, image 202a and image 202b pass through a rectification network 204. To rectify the images, the rectification network 204 learns two projective transformation matrices (i.e., homographies that are invertible 3×3 real matrices) and warps image pairs with the projective transform matrices.

Figure 3:
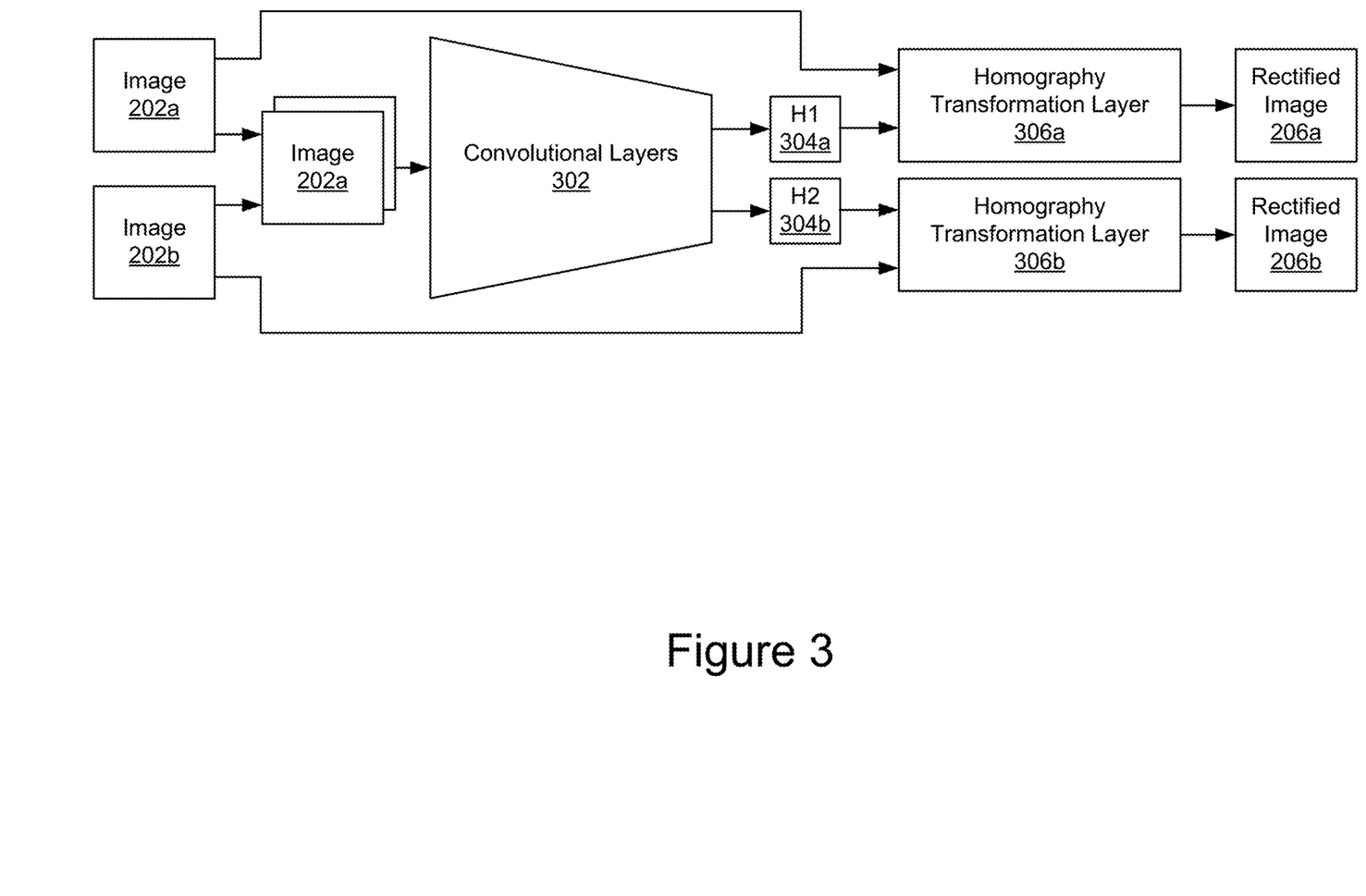
FIG. 3 is a block diagram depicting an example rectification network according to the techniques disclosed herein.

FIG. 3 is a block diagram depicting an example rectification network according to the techniques disclosed herein. As depicted in the example of FIG. 3, the rectification network 204 includes convolutional layers 302 that receive a stack of image 202a and image 202b as inputs. The convolutional layers 302 generate a homography transformation matrix 304a for image 202a and a homography transformation matrix 304b for image 202b. The homography transform matrix 304a is used by homography transformation layer 306a to warp image 202a and generate rectified image 206a and homography transform matrix 304b is used by homography transformation layer 306b to warp image 202b to generate rectified image 206b.

Figure 4:
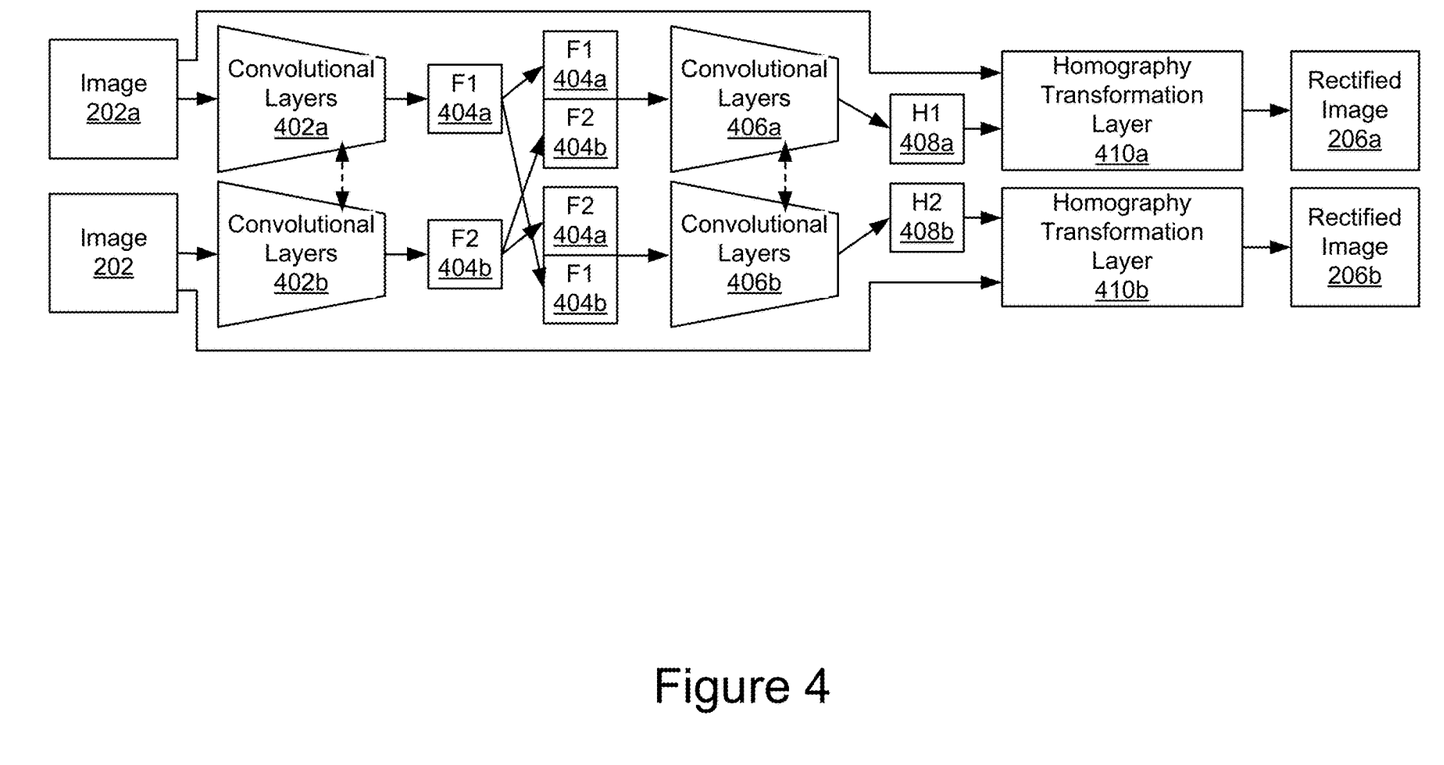
FIG. 4 is a block diagram depicting an example rectification network according to the techniques disclosed herein.

FIG. 4 is a block diagram depicting another example rectification network according to the techniques disclosed herein. In the example of FIG. 4, image 202a is processed through convolutional layers 404a to generate a set of features 404a corresponding to image 202a. Similarly, image 202b is processed through convolutional layers 404b to generate a set of features 404b corresponding to image 202b. The features 404a and 404b are combined and processed by convolutional layers 406a and convolutional layers 406b to generate a homography transformation matrix 408a and homography transformation matrix 408b. Homography transformation layer 410a processes image 202a using the homography transform matrix 408a to generate rectified image 206a and homography transformation layer 410b processes image 202b to generate rectified image 206b.

Figure 5:
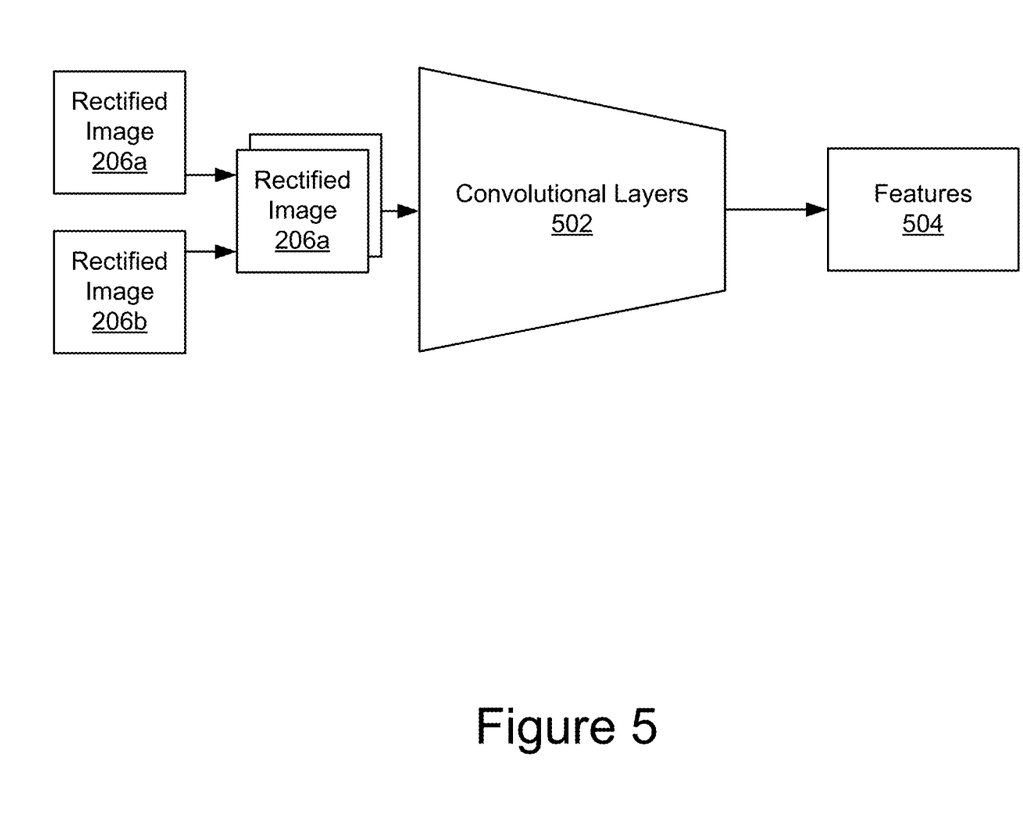
FIG. 5 is a block diagram depicting an example encoder network according to the techniques disclosed herein.
Figure 6:
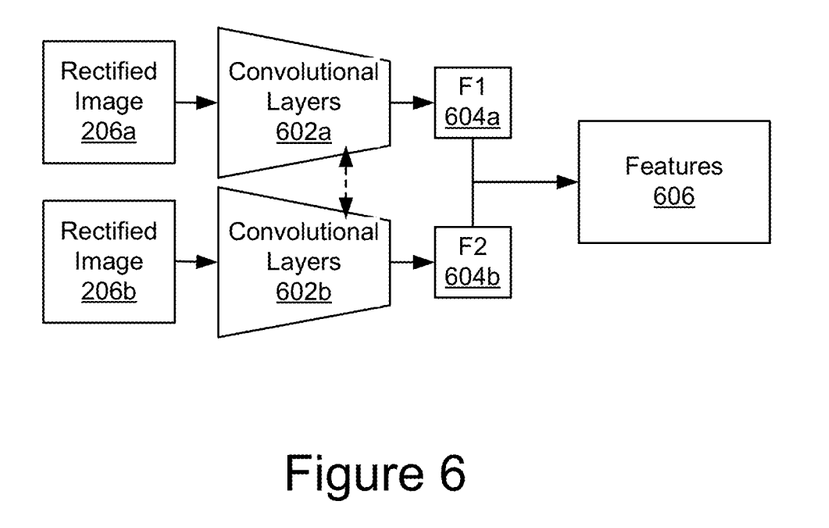
FIG. 6 is a block diagram depicting an example encoder network according to the techniques disclosed herein.

FIG. 5 is a block diagram depicting an example encoder network 208 according to the techniques disclosed herein. The encoder network 208 takes a stack of rectified image 206a and rectified image 206b and encodes those images as a set of features 504 using convolutional layers 502. FIG. 6 is a block diagram depicting an example encoder network 208 according to the techniques disclosed herein. In one embodiment, encoder network 208 includes two convolutional layers 602a and 602b with shared weights between the two encoders for two rectified images as depicted in the example of FIG. 6. Output features 604a and 604b of the convolutional layers 602a and 602b are concatenated to encode the viewpoint transformation between the input images as a set of feature 606.

Figure 7:
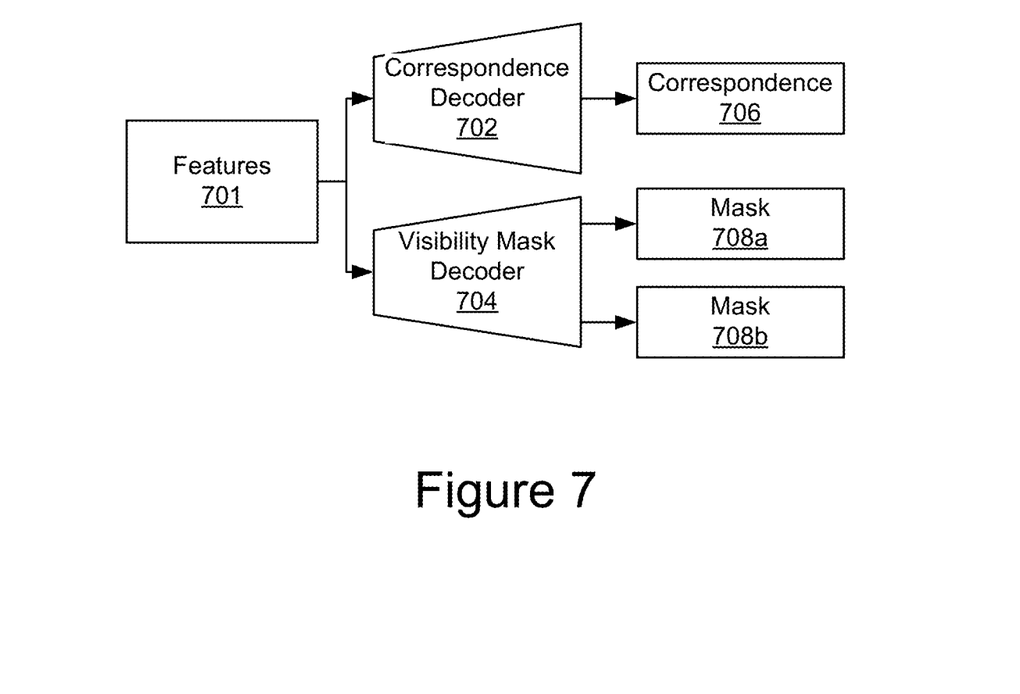
FIG. 7 is a block diagram depicting an example decoder network according to the techniques disclosed herein.

FIG. 7 is a block depicting an example decoder network according to the techniques disclosed herein. The decoder network takes a set of feature 701 from an encoder network (e.g., the encoder networks depicted in FIGS. 5 and 6) and decodes the feature 701 using a correspondence decoder 702 to generate dense point correspondences 706 between the two rectified images 206a and 206b. A visibility mask decoder 704 uses the features 701 to generate blending masks 708a and 708b that are used by the view morphing network 214 in synthesizing the output image 214. The masks 708a and 708b take into account the portions of the input images that may be hidden or visible in the output image 214 but are visible (or not visible) in one or more of the input views. In one embodiment, a preliminary output of the view morphing network is multiplied by the blending masks to provide an output that is more in line with the shape of the input views.

Figure 8:
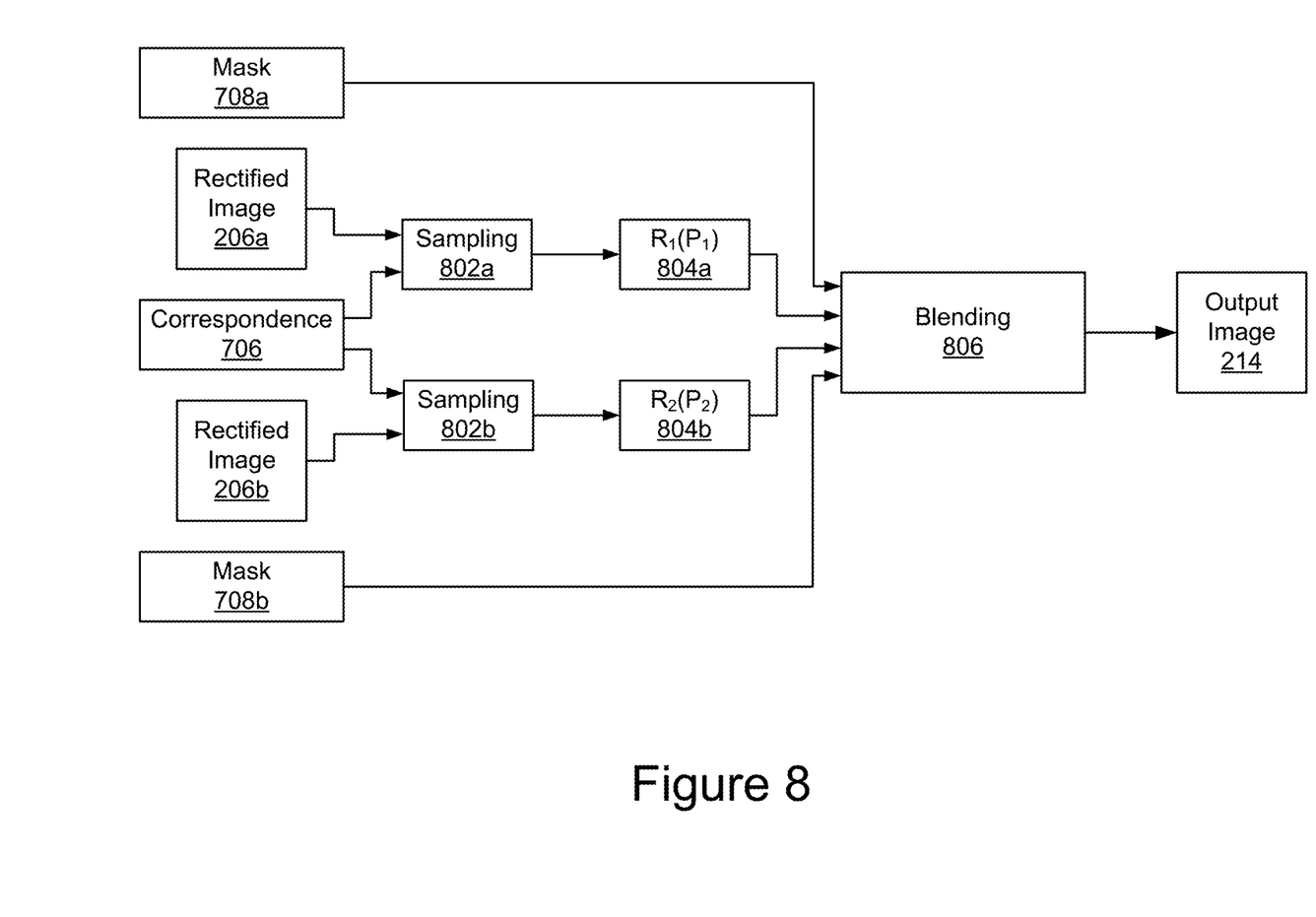
FIG. 8 is a block diagram depicting an example view morphing network according to the techniques disclosed herein.

FIG. 8 is a block diagram depicting an example view morphing network according to the techniques disclosed herein. Using the output dense point correspondences 706 of the decoder network 210 and the rectified images 206a and 206b, the view morphing network 212 generates output image 214 that is a middle view between the rectified images 206a and 206b. Let C(q) denote the output 706 of the correspondence decoder 702 where q is the pixel coordinates of the middle view to be synthesized. Then the point correspondence sets $P_1=\{p_1^i, \ldots, p_1^N\}$ and $P_2=\{p_2^1, \ldots, p_2^N\}$ between the rectified images 206a and 206b, respectively, can be determined by the following equation:

$$p_1^i = q^i + C(q^i), p_2^i = q^i - C(q^i).$$

Let $M_1$ and $M_2=1-M_1$ denote the blending masks 708a and 708b predicted by the visibility decoder 704 and $R_1$ and $R_2$ denote the two rectified images 206a and 206b. Then the middle view output image 214 $R_m$ between $R_1$ and $R_2$ can be synthesized by the following equation:

$$R_m = M_1 \odot R_1(P_1) + M_2 \odot R_2(P_2),$$

where $\odot$ represents element-wise multiplication and $R_1(P_1)$ and $R_2(P_2)$ are images sampled from $R_1$ and $R_2$ by interpolation. View morphing network 212 as depicted in the example of FIG. 8, includes a sampling 802a of rectified image 206a using the dense correspondences 706 and a sampling 802b of rectified image 206b using the dense correspondences to generate sampled images 804a and 804b, respectively. The view morphing network 212 blends 806 the sampled images 804a and 804b with the blending masks 708a and 708b to finally synthesize the output image 214.

The network 200 is trained using two input image views, image 202a and image 202b, and the corresponding desired ground truth middle view image. The loss function used to train the network 200 is the Euclidean loss between the output 214 and the ground truth image defined as:

$$L = \sum_{i=1}^{M} \frac{1}{2} \|R_m(q^i) - R_{GT}(q^i)\|_2^2,$$

where $R_{GT}$ is the ground truth image and M is the number of pixels.

In some embodiments, where the assumption of a synthesized view that is centered between the two rectified images 206a and 206b cannot be made, then any intermediate views between $R_1$ and $R_2$ can be synthesized as a post-processing step with the following equation:

$$R_\alpha((1-\alpha)P_1^i + \alpha p_2^i) = w_1(1-\alpha)R_i(p_1^i) + w_2\alpha R_2(p_2^i),$$

where $0 \leq \alpha \leq 1$ and $$w_1 = \frac{(1-\alpha)M_1(p_1^i)}{(1-\alpha)M_1(p_1^i) + \alpha M_2(p_2^i)} \text{ and } w_2 = 1 - w_1.$$

Here $\alpha=0$ and $\alpha=1$ corresponds to $R_1$ and $R_2$, respectively. Since these $R_\alpha$ are intermediate views between the rectified images 206a and 206b, proper post-warping with homographies can be optionally applied to $R_\alpha$ to generate intermediate views between the input images 202a and 202b.

Figure 9:
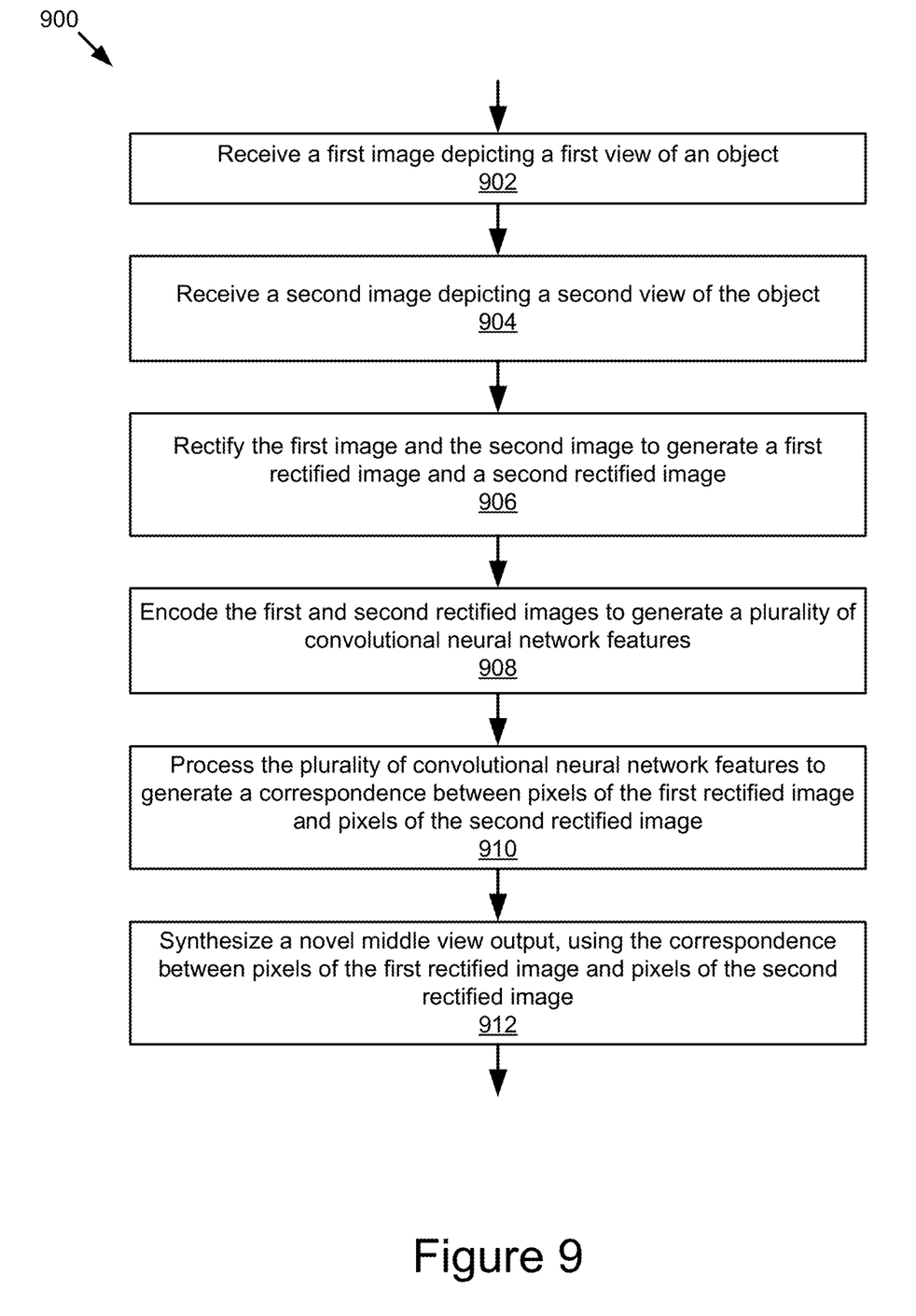
FIG. 9 is a block diagram depicting an example process for generating a novel view according to the techniques disclosed herein.

FIG. 9 is a block diagram depicting an example process for generating a novel view according to the techniques disclosed herein. At 902, the network 200 receives a first image depicting a first view of an object. For example, as depicted in the example of FIG. 2, the network 200 receives image 202a. At 904, the network 200 receives a second image depicting a second view of the object (e.g., image 202b). The first image 202a and the second image 202b may depict an object, for example, from a right perspective view and a left perspective view corresponding to the first and second view of the object depicted in the images 202a and 202b.

At 906, a rectification network 204 rectifies the first image and the second image to generate a first rectified image and a second rectified image. As described above, rectifying the first image and the second image simplifies the remaining steps in the view synthesis process by limiting correspondence estimation to a one-dimensional search.

At 908, an encoder network 208 encodes the first and second rectified images (e.g., rectified images 206a and 206b) to generate convolutional neural network features and at 910 a decoder network 210 processes the convolutional neural network features to generate a correspondence between pixels of the first rectified image and pixels of the second rectified image, and blending masks that represents the visibility of pixels of the rectified images in the synthesized middle view.

At 912, the view morphing network 212 synthesizes the novel middle view output using the correspondence between pixels of the first rectified image and pixels of the second rectified image, and the blending masks.

It should be noted that the components and steps provided above are provided for illustration and that other components and processes are possible and contemplated in the techniques described herein. Further, the steps may be performed in different orders than those listed, additional or fewer steps are possible, and the steps and components performing the steps may be delineated differently than those of the provided examples.

Figure 10:
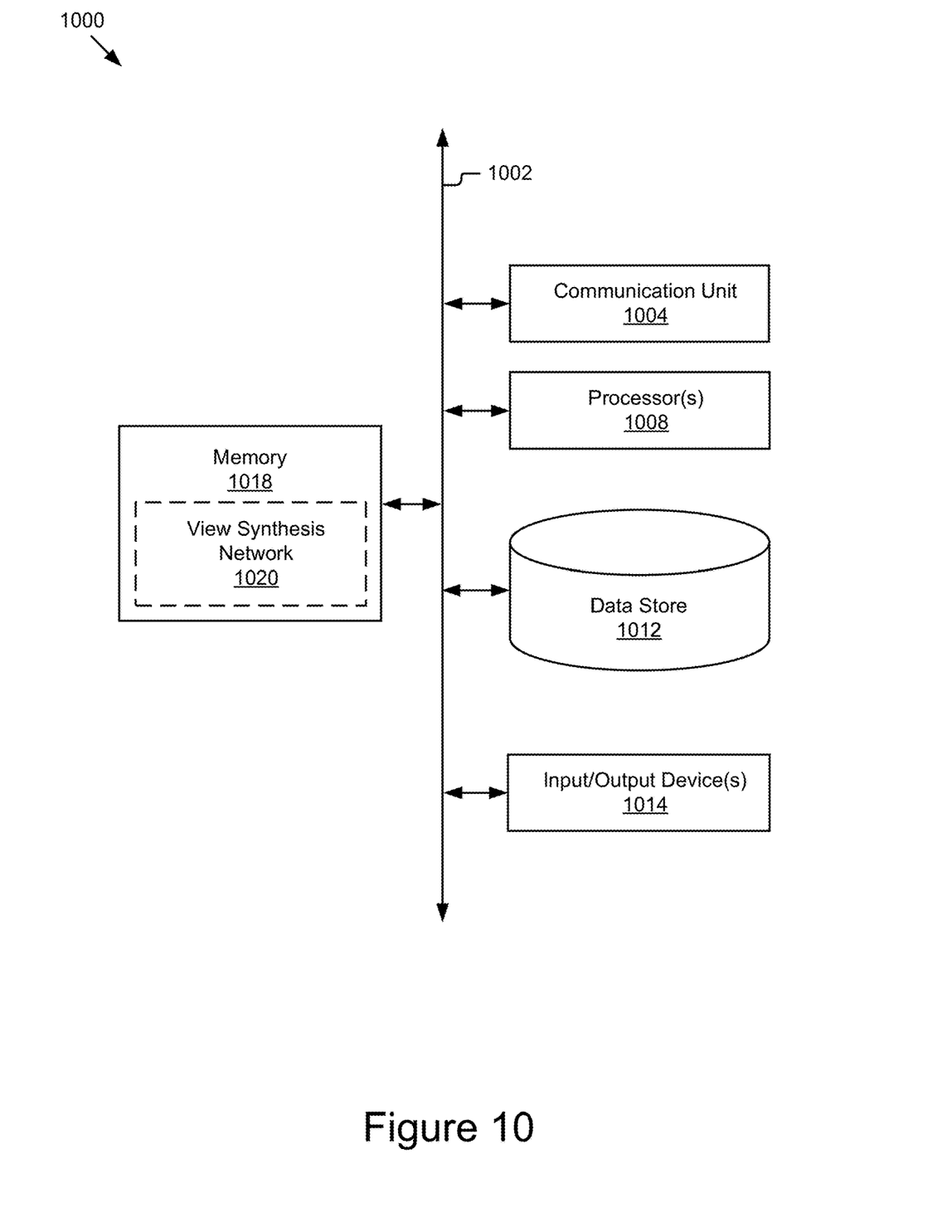
FIG. 10 is a block diagram of an example computing system for implementing the network according to the techniques disclosed herein.

FIG. 10 is a block diagram of an example computing system 1000, which may represent the computer architecture of a computing device, computing entity, or server for implementing the view synthesis network 200. As depicted in FIG. 10, the computing system 1000 may include a communication unit 1004, a processor(s) 1008, a memory(ies) 1018, a data store 1012, and/or an input/output device(s) 1014, connected by a communication bus 1002, depending on the configuration. The computing system 1000 depicted in FIG. 10 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 1000 may include various operating systems, sensors, additional processors, and other physical configurations. Although, for purposes of clarity, FIG. 10 only shows a single communication unit 1004, processor 1008, data store 1012, input/output device 1014, and memory 1018, it should be understood that the computing system 1000 may include none or a plurality of one or more of these components.

The bus 1002 may include a communication bus for transferring data between components of a computing device or between computing devices, a network bus system, a processor mesh, a combination thereof, etc. The communication bus can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 1004 may include one or more interface devices (I/F) for wired and wireless connectivity among a larger network of computing entities. For instance, the communication unit 1004 may include, but is not limited to, various types known connectivity and interface options. The communication unit 1004 may be coupled to the other components of the computing system 1000 via the bus 1002. The communication unit 404 can provide other connections to a network and to other entities using various standard communication protocols or proprietary communication protocols, as described elsewhere herein.

The processor 1008 may execute software instructions by performing various input, logical, and/or mathematical operations. The processor 1008 may have various computing architectures including, for example, a complex instruction set computer (CISC) architecture, a reduced instruction set computer (RISC) architecture, and/or an architecture implementing a combination of instruction sets. The processor 1008, which may include one or more processors, may be physical and/or virtual, and may include a single core or plurality of processing units and/or cores. In some implementations, the processor 1008 may be capable of generating and providing electronic display signals to a display device, supporting the display of images, capturing and transmitting images, performing complex tasks including various types of feature extraction and sampling, etc. In some implementations, the processor 1008 may be coupled to the memory 1018 via the bus 1002 to access data and instructions therefrom and store data therein.

The memory(ies) 1018 may store and provide access to data to the other components of the computing system 1000. The memory 1018 may be included in a single computing device or a plurality of computing devices. In some implementations, the memory 1018 may store instructions and/or data that may be executed by the processor 1008. For example, the memory 1018 may store view morphing network 1020. The memory 1018 is also capable of storing other instructions and data, including, for example, an operating system, hardware drivers, other software applications, databases, etc. The memory 1018 may be coupled to the bus 402 for communication with the processor 1008 and the other components of computing system 1000.

The memory 1018 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 1008. In some implementations, the memory 1016 may include one or more of volatile memory and non-volatile memory (e.g., RAM, ROM, hard disk, optical disk, etc.). It should be understood that the memory 1016 may be a single device or may include multiple types of devices and configurations.

In some implementations, the view morphing network 1020 can be implemented using programmable or specialized hardware including a field-programmable gate array (FPGA) or an application-specific integrated circuit (ASIC). In some implementations, the view morphing network 1020 can be implemented using a combination of hardware and software executable by processor 1008. In some implementations, the view morphing network 1020 may be sets of instructions executable by the processor 1008.

The data store 1012 is an information source for storing and providing access to data. The data stored by the data store 1012 may organized and queried using various criteria including any type of data stored by them. The data store 1012 may include data tables, databases, or other organized collections of data.

The input/output device(s) 1014 may include any device for inputting or outputting information into the computing system 1000. For example, the input/output device(s) 1014 may include one or more input devices, such as a keyboard, a pointing device, microphone, an image/video capture device (e.g., camera), a touch-screen display, etc. The input/output device(s) 1014 may include one or more output devices, such as one or more of a display (LCD, OLED, etc.), a printer, a haptic device, audio reproduction device, touch-screen display, etc. In some implementations, the output device is a display, which may display electronic images and data output by the computing system 1000 for presentation to a user. In some implementations, the computing system 1000 may include a graphics adapter (not shown) for rendering and outputting the images and data for presentation on an output device. The graphics adapter (not shown) may be a separate processing device including a separate processor and memory (not shown) or may be integrated with the processor 1008 and memory 1018.

It should be noted that the components described herein, for example, in reference to FIG. 10 may be further delineated or changed without departing from the techniques described herein. For example, the processes described throughout this disclosure may be performed by fewer, additional, or different components. The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions and/or formats.

What is claimed is:

1. A method comprising:
   receiving a first image depicting a first view of an object;
   receiving a second image depicting a second view of the object, the second view being a view of the object different from the first view of the object;
   rectifying the first image to generate a first rectified image;
   rectifying the second image to generate a second rectified image;
   generating a plurality of convolutional neural network features encoding a viewpoint transformation between the first rectified image and the second rectified image using a plurality of convolutional layers of a convolutional neural network on the first rectified image and the second rectified image;
   generating a first blending mask and a second blending mask and a correspondence between pixels of the first rectified image and pixels of the second rectified image by processing the plurality of convolutional neural network features, the first blending mask predicting visibility of the pixels of the first rectified image in an output image and the second blending mask predicting visibility of the pixels of the second rectified image in the output image;
   sampling the first rectified image and the second rectified image using the correspondence between the pixels of the first rectified image and the pixels of the second rectified image;
   generating a first product of the sampled first rectified image and the first blending mask and a second product of the sampled second rectified image and the second blending mask, a value of the first blending mask and the second blending mask being between 0 and 1;
   performing an interpolation of the first product and the second product; and
   synthesizing the output image representing an intermediate view image depicting the object in a view between the first view of the object in the first image and the second view of the object in the second image based on the interpolation of the first product and the second product.

2. The method of claim 1, wherein rectifying the first image and the second image further comprises:
   generating a first homography transformation matrix based on the first image and the second image;
   generating a second homography transformation matrix for the second image based on the first image and the second image;
   warping the first image, using the first homography transformation matrix, to generate the first rectified image; and
   warping the second image, using the second homography transformation matrix, to generate the second rectified image.

3. The method of claim 1, wherein rectifying the first image and rectifying the second image further comprises:
   generating a first set of features for the first image;
   generating a second set of features for the second image;
   fusing the first set of feature and the second set of features to generate a set of fused features for the first and second image;
   generating a first homography transformation matrix using the set of fused features for the first and second image, wherein the first homography transformation matrix corresponds to the first image;
   generating a second homography transformation matrix using the set of fused features for the first and second image, wherein the second homography transformation matrix corresponds to the second image;
   warping the first image, using the first homography transformation matrix, to generate the first rectified image; and
   warping the second image, using the second homography transformation matrix, to generate the second rectified image.

4. The method of claim 1, wherein generating the plurality of convolutional neural network features comprises:
   encoding the first rectified image to generate a first set of convolutional neural network features;
   encoding the second rectified image to generate a second set of convolutional neural network features; and
   generating the plurality of convolutional neural network features by fusing the first set of convolutional neural network features and the second set of convolutional neural network features.

5. The method of claim 1, wherein the correspondence between pixels is one-dimensional.

6. The method of claim 1, wherein synthesizing the output image comprises:
   performing a linear interpolation of pixel values, blending mask values, and locations of corresponding pixels between the first rectified image and the second rectified image.

7. A system comprising:
   one or more processors; and
   a memory, the memory storing instructions, which when executed by the one or more processors, cause the one or more processors to:
   receive a first image depicting a first view of an object;
   receive a second image depicting a second view of the object, the second view being a view of the object different from the first view of the object;
   rectify the first image to generate a first rectified image;
   rectify the second image to generate a second rectified image;
   generate a plurality of convolutional neural network features encoding a viewpoint transformation between the first rectified image and the second rectified image using a plurality of convolutional layers of a convolutional neural network on the first rectified image and the second rectified image;

generate a first blending mask and a second blending mask and a correspondence between pixels of the first rectified image and pixels of the second rectified image by processing the plurality of convolutional neural network features, the first blending mask predicting visibility of the pixels of the first rectified image in an output image and the second blending mask predicting visibility of the pixels of the second rectified image in the output image;

sample the first rectified image and the second rectified image using the correspondence between the pixels of the first rectified image and the pixels of the second rectified image;

generate a first product of the sampled first rectified image and the first blending mask and a second product of the sampled second rectified image and the second blending mask, a value of the first blending mask and the second blending mask being between 0 and 1;

perform an interpolation of the first product and the second product; and synthesize the output image representing an intermediate view image depicting the object in a view between the first view of the object in the first image and the second view of the object in the second image based on the interpolation of the first product and the second product.

8. The system of claim 7, wherein to rectify the first image and the second image, the instructions further cause the one or more processors to:

generate a first homography transformation matrix based on the first image and the second image;

generate a second homography transformation matrix for the second image based on the first image and the second image;

warp the first image, using the first homography transformation matrix, to generate the first rectified image; and warp the second image, using the second homography transformation matrix, to generate the second rectified image.

9. The system of claim 7, wherein to rectify the first image and to rectify the second image, the instructions further cause the one or more processors to:

generate a first set of features for the first image;

generate a second set of features for the second image;

fuse the first set of feature and the second set of features to generate a set of fused features for the first and second image;

generate a first homography transformation matrix using the set of fused features for the first and second image, wherein the first homography transformation matrix corresponds to the first image;

generate a second homography transformation matrix using the set of fused features for the first and second image, wherein the second homography transformation matrix corresponds to the second image;

warp the first image, using the first homography transformation matrix, to generate the first rectified image; and warp the second image, using the second homography transformation matrix, to generate the second rectified image.

10. The system of claim 7, wherein to generate the plurality of convolutional neural network features, the instructions further cause the one or more processors to:

encode the first rectified image to generate a first set of convolutional neural network features;

encode the second rectified image to generate a second set of convolutional neural network features; and generate the plurality of convolutional neural network features by fusing the first set of convolutional neural network features and the second set of convolutional neural network features.

11. The system of claim 7, wherein the correspondence between pixels is one-dimensional.

12. The system of claim 7, wherein to synthesize the output image, the instructions cause the one or more processors to:

perform a linear interpolation of pixel values, blending mask values, and locations of corresponding pixels between the first rectified image and the second rectified image.

13. A non-transitory computer readable medium storing instructions which, when executed by a computer, cause the computer to:

receive a first image depicting a first view of an object;

receive a second image depicting a second view of the object, the second view being a view of the object different from the first view of the object;

rectify the first image to generate a first rectified image;

rectify the second image to generate a second rectified image;

generate a plurality of convolutional neural network features encoding a viewpoint transformation between the first rectified image and the second rectified image using a plurality of convolutional layers of a convolutional neural network on the first rectified image and the second rectified image;

generate a first blending mask and a second blending mask and a correspondence between pixels of the first rectified image and pixels of the second rectified image by processing the plurality of convolutional neural network features, the first blending mask predicting visibility of the pixels of the first rectified image in an output image and the second blending mask predicting visibility of the pixels of the second rectified image in the output image;

sample the first rectified image and the second rectified image using the correspondence between the pixels of the first rectified image and the pixels of the second rectified image;

generate a first product of the sampled first rectified image and the first blending mask and a second product of the sampled second rectified image and the second blending mask, a value of the first blending mask and the second blending mask being between 0 and 1;

perform an interpolation of the first product and the second product; and synthesize the output image representing an intermediate view image depicting the object in a view between the first view of the object in the first image and the second view of the object in the second image based on the interpolation of the first product and the second product.

14. The non-transitory computer readable medium of claim 13, wherein to rectify the first image and the second image, the instructions further cause the computer to:

generate a first homography transformation matrix based on the first image and the second image;

generate a second homography transformation matrix for the second image based on the first image and the second image;

warp the first image, using the first homography transformation matrix, to generate the first rectified image; and warp the second image, using the second homography transformation matrix, to generate the second rectified image.

15. The non-transitory computer readable medium of claim 13, wherein to rectify the first image and to rectify the second image, the instructions further cause the computer to:
generate a first set of features for the first image;
generate a second set of features for the second image;
fuse the first set of feature and the second set of features to generate a set of fused features for the first and second image;
generate a first homography transformation matrix using the set of fused features for the first and second image, wherein the first homography transformation matrix corresponds to the first image;
generate a second homography transformation matrix using the set of fused features for the first and second image, wherein the second homography transformation matrix corresponds to the second image;
warp the first image, using the first homography transformation matrix, to generate the first rectified image; and
warp the second image, using the second homography transformation matrix, to generate the second rectified image.

16. The non-transitory computer readable medium of claim 13, wherein to generate the plurality of convolutional neural network features, the instructions further cause the computer to:
encode the first rectified image to generate a first set of convolutional neural network features;
encode the second rectified image to generate a second set of convolutional neural network features; and
generate the plurality of convolutional neural network features by fusing the first set of convolutional neural network features and the second set of convolutional neural network features.

17. The non-transitory computer readable medium of claim 15, wherein the correspondence between pixels is one-dimensional.

\* \* \* \* \*

UNITED STATES PATENT AND TRADEMARK OFFICE
CERTIFICATE OF CORRECTION

PATENT NO. : 10,846,836 B2
APPLICATION NO. : 15/351340
DATED : November 24, 2020
INVENTOR(S) : Junghyun Kwon et al.

Page 1 of 1

It is certified that error appears in the above-identified patent and that said Letters Patent is hereby corrected as shown below:

In the Claims

In Column 14, Line 18, please replace "claim 15" with --claim 13--

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*